(12) United States Patent
Palmqvist

(10) Patent No.: US 9,657,847 B2
(45) Date of Patent: May 23, 2017

(54) PRESSURE RELIEF VALVE

(71) Applicant: Pres-Vac Engineering ApS, Allerød (DK)

(72) Inventor: Ronni Palmqvist, Copenhagen (DK)

(73) Assignee: PRES-VAC ENGINEERING APS, Allerød (DK)

( * ) Notice: Subject to any disclaimer, the term of this patent is extended or adjusted under 35 U.S.C. 154(b) by 120 days.

(21) Appl. No.: 14/415,029

(22) PCT Filed: Jul. 17, 2013

(86) PCT No.: PCT/EP2013/065075
§ 371 (c)(1),
(2) Date: Jan. 15, 2015

(87) PCT Pub. No.: WO2014/012967
PCT Pub. Date: Jan. 23, 2014

(65) Prior Publication Data
US 2015/0184756 A1    Jul. 2, 2015

(30) Foreign Application Priority Data

Jul. 18, 2012  (DK) .................. 2012 70435

(51) Int. Cl.
*F16K 1/54*    (2006.01)
*F16K 17/12*   (2006.01)
(Continued)

(52) U.S. Cl.
CPC ............... *F16K 1/54* (2013.01); *F16K 1/38* (2013.01); *F16K 17/12* (2013.01); *F16K 24/04* (2013.01)

(58) Field of Classification Search
CPC ............. F16K 1/03; F16K 17/12; F16K 24/04
(Continued)

(56) References Cited

U.S. PATENT DOCUMENTS 3,603,343 A   9/1971  Keller
3,826,277 A   7/1974  Bois
(Continued)

FOREIGN PATENT DOCUMENTS

CN        1878977 A      12/2006
CN        200943741 Y     9/2007
(Continued)

OTHER PUBLICATIONS

Danish Search Report received for Patent Application No. PA201270435, completed on Feb. 28, 2013, 2 pages.
(Continued)

*Primary Examiner* — Craig Schneider
*Assistant Examiner* — P. Macade Nichols
(74) *Attorney, Agent, or Firm* — Morrison & Foerster LLP

(57) ABSTRACT

A pressure relief valve for pressure equalization between an essentially closed space and the surrounding atmosphere is disclosed. The pressure relief valve includes a valve housing with:—a wall defining a flow passage with an upwardly oriented outflow,—a valve body arranged to cooperate with a valve seat arranged in the outflow,—a stem configured for axial guidance of the valve body,—a damper arranged to dampen axial movement of the stem, wherein the damper is configured such that force curves of compression and expansion respectively diverge due to hysteresis loss or pronounced hysteresis loss.

21 Claims, 2 Drawing Sheets

(51) Int. Cl.
*F16K 24/04* (2006.01)
*F16K 1/38* (2006.01)

(58) Field of Classification Search
USPC .................... 137/471, 528–543; 251/64, 65
See application file for complete search history.

(56) References Cited

U.S. PATENT DOCUMENTS

| | | | |
|---|---|---|---|
| 3,999,571 A | 12/1976 | Pedersen et al. | |
| 4,016,904 A | 4/1977 | Gordon | |
| 4,243,064 A | 1/1981 | Nolte | |
| 4,364,541 A | 12/1982 | Chabat-Courrede et al. | |
| 4,763,754 A | 8/1988 | Coppolani et al. | |
| 5,060,688 A * | 10/1991 | Sorensen | F16K 17/08 137/471 |
| 5,094,266 A | 3/1992 | Ledbetter | |
| 5,172,716 A | 12/1992 | Paptzun | |
| 5,230,364 A | 7/1993 | Leng et al. | |
| 5,381,997 A | 1/1995 | Anderson et al. | |
| 5,607,001 A | 3/1997 | Petersen | |
| 5,873,384 A | 2/1999 | Pedersen et al. | |
| 7,207,350 B2 * | 4/2007 | Sorensen | F16K 17/02 137/471 |
| 2003/0010385 A1 | 1/2003 | Il | |
| 2004/0065385 A1 | 4/2004 | Sorensen | |
| 2004/0177883 A1 | 9/2004 | Sorensen et al. | |
| 2006/0196476 A1 | 9/2006 | Stockner | |
| 2011/0315907 A1 | 12/2011 | Ams et al. | |

FOREIGN PATENT DOCUMENTS

| | | |
|---|---|---|
| CN | 101128691 A | 2/2008 |
| CN | 201166174 Y | 12/2008 |
| DE | 2537052 A1 | 3/1977 |
| DE | 3912969 A1 | 10/1990 |
| DE | 29700833 U1 | 5/1997 |
| DE | 20300159 U1 | 4/2003 |
| DE | 102004054589 A1 | 5/2006 |
| DE | 202008016113 U1 | 4/2009 |
| DK | 0999392 T3 | 8/2004 |
| EP | 0047217 A1 | 3/1982 |
| EP | 1154179 A2 | 11/2001 |
| EP | 0999392 B1 | 4/2004 |
| FR | 1569858 A | 6/1969 |
| GB | 552627 A | 4/1943 |
| GB | 884558 | 12/1961 |
| GB | 1109429 A | 4/1968 |
| GB | 1157495 A | 7/1969 |
| GB | 1228130 A | 4/1971 |
| GB | 2172081 A | 9/1986 |
| GB | 2194311 A | 3/1988 |
| GB | 2199373 A | 7/1988 |
| GB | 2416382 A | 1/2006 |
| JP | 57-89086 U | 6/1982 |
| JP | 59-93579 U | 5/1984 |
| JP | 2836953 B2 | 12/1998 |
| JP | 2009-236148 A | 10/2009 |
| WO | 19931016310 A1 | 8/1993 |
| WO | 96/01962 A1 | 1/1996 |
| WO | 96/35898 A1 | 11/1996 |
| WO | 98/57082 A1 | 12/1998 |
| WO | 00/75543 A1 | 12/2000 |
| WO | 2005/038325 A1 | 4/2005 |
| WO | 20051093302 A1 | 10/2005 |
| WO | 20071085261 A1 | 8/2007 |
| WO | 2009/039857 A1 | 4/2009 |
| WO | 2011/032561 A2 | 3/2011 |
| WO | 2013/083832 A1 | 6/2013 |

OTHER PUBLICATIONS

International Preliminary Report on Patentability received for PCT Patent Application No. PCT/EP2013/065075, completed on Aug. 11, 2014, 32 pages.
International Search Report and Written Opinion received for PCT Patent Application No. PCT/EP2013/065075, mailed on Oct. 4, 2013, 8 pages.
International Written Opinion received for PCT Patent Application No. PCT/EP2013/065075, mailed on Jun. 30, 2014, 5 pages.
Final Office Action received for U.S. Appl. No. 14/362,342, mailed on Nov. 23, 2016, 11 pages.
International Preliminary Report on Patentability received for PCT Patent Application No. PCT/EP2012/074933, mailed on Nov. 18, 2013, 6 pages.
International Search Report and Written Opinion received for PCT Patent Application No. PCT/EP2012/074933, mailed on Feb. 11, 2013, 9 pages.
Non-Final Office Action received for U.S. Appl. No. 14/362,342, mailed on Jun. 29, 2016, 14 pages.
Office Action received for Chinese Patent Application No. 201280060031.5, mailed on Apr. 15, 2015, 6 pages(English Translation Only).
Office Action received for Japanese Patent Application No. 2014-545304, mailed on Aug. 22, 2016, 5 pages (1 page of English Translation and 4 pages Official Copy Only).
Search Report received for Denmark Patent Application No. 201170694, mailed on Jul. 16, 2012, 1 page (official Copy Only). (See Communication under 37 CFR § 1.98(a) (3)).

* cited by examiner

PRESSURE RELIEF VALVE

CROSS REFERENCE TO RELATED APPLICATIONS

This application is a U.S. National Stage patent application of PCT/EP2013/065075, filed on Jul. 17, 2013, which claims priority to Patent Application No. PA 2012 70435, filed in Denmark on Jul. 18, 2012, the entire contents of which are incorporated herein by reference.

Field of the Invention

The present invention relates to a pressure relief valve for equalizing pressure differences between a closed container, or a tank, and its surrounding atmosphere. In particular, the invention relates to a pressure relief valve configured for pressure equalization of cargo hold tanks in a maritime carrier.

The pressure relief valve according to the present invention may, however, also lend itself for use in connection with stationary tanks and mobile tanks and the like.

The pressure relief valve according to the present invention may constitute a high velocity pressure relief valve configured to prevent passage of flames. A high velocity pressure relief valve is configured to, or adjusts, the opening available for outflow such that the velocity of the gas released from the outlet of the valve at any time is minimum 30 m/s.

According to a first aspect, the present invention relates to a pressure relief valve for pressure equalization between an essentially closed space and the, or its, surrounding atmosphere. The pressure relief valve inter alia includes a valve housing with:
- a wall defining a flow passage with an upwardly oriented outflow passage,
- a valve body arranged to cooperate with a valve seat arranged in the outflow. The valve body has an outer surface geometry configured for collecting a flow of gas that flows through the outflow passage and around the valve body to form an upwardly oriented jet,
- a stem configured for axial guidance of the valve body in and out of the valve seat,
- a damper arranged to dampen axial movement of the valve body.

BACKGROUND OF THE INVENTION

When a tank or other closed, or essentially closed, space is loaded with a given volume of liquid per time unit, pressure relief valves of the type according to the present invention may be applied to the tank in order to release gas when the pressure within the tank reaches a predefined opening pressure.

Further, pressure relief valves of the type according to the present invention may be configured to release gas when the pressure within the tank reaches a predefined opening pressure as a result of evaporation of or from the liquid in the tank. Additionally, any increase or drop in the ambient temperature during storage or transport may lead to pressure changes within the container. The pressure changes may bring about a certain volume of boiling-off, from product like petroleum products and other chemicals, which may cause the pressure relief valve to open.

The volume vented through the valve, per time unit, defines the capacity of the valve. The capacity depends primarily on the flow resistance through the valve and of the pressure prevailing within the tank.

The capacity of the pressure valve determines the maximally allowable loaded volume per time unit. When, upon interruption of the loading, the pressure within the tank drops to a certain value, i.e. the closing pressure of the pressure valve, the pressure relief valve closes.

The closing pressure of the valve is typically lower than the opening pressure of the valve. In most of the known pressure relief valves, the closing pressure is considerably lower than the opening pressure.

Another use of pressure relief valves applies when, for safety reasons, it is required to supply an inert gas, such as nitrogen, to the free ullage of the container above and/or around the product being transported. For instance, the product may be inflammable liquid or perishable goods such as oranges and lemons that give off inflammable gasses following storage. The inert gas is automatically kept at a predetermined pressure that may be above the atmospheric pressure, but below the opening pressure of the pressure valve. In this case any rise or a drop in the temperature of the surroundings will give rise to a corresponding change in the pressure of the inert gas within the container. This pressure change may be controlled by a pressure relief valve according to one aspect of the present invention.

It has been found that pressure relief valves tend to open and close in a rapid fluctuating or oscillating manner. The fluctuations cause the valve body and the stem to oscillate. This undesirable behaviour cause increase wear and tear on the valve and may cause the velocity through the valve to drop below 30 m/s allowing a flame to travel, or propagate, through the valve.

The fluctuations or oscillations may be caused by the design of the valve or by fluctuations in pressure caused by the/any pipe system between valve and tank or the tank it selves. In other words, the oscillations lead to improper or even dangerous valve operation. This behaviour is hereafter defined as undamped oscillation, or opening or closing, of the pressure relief valve.

WO 0 50 93 302 A discloses a pressure relief valve comprising a housing containing a valve seat and a spring loaded valve body that can be displaced in the housing between open and closed positions. The pressure required to hold the valve body in its open position, above the valve seat, is lower than the pressure required to lift the valve body from the valve seat.

US 2004 177883 A, by the present applicant, discloses a pressure relief valve of the type according to the present invention. The pressure relief valve includes a valve body and a lifting plate. The pressure relief valve is configured such that, at any time, the container to be ventilated is in communication with the area above the lifting plate. The valve further include a magnet and a magnetisable body and the force of attraction Fm between the magnet and the magnetisable body as well as the mass of the lifting plate contribute in defining the abutment force Fc, of the valve body against the valve seat of the valve in its closed state.

U.S. Pat. No. 5,873,384 A also by the present applicant, discloses a pressure relief valve of the type according to the present invention. The valve include a housing and a drop-shaped valve body with a conical valve surface that cooperates with a conical valve seat at an upwardly directed blow-off opening of the valve housing. The drop-shaped body is connected to a lifting disc in the housing. The inner configuration of the housing provides an annular passage around the lifting disc which is smaller in area when the lifting disc is in its uppermost, fully open positioning as compared to its lowermost, closed positioning.

US 2004177883 A as well as U.S. Pat. No. 5,873,384 A are incorporated herein in their entirety.

It is an object of the present invention to provide a pressure relief valve of the kind described above. According to the invention, measures are taken in order to prevent undamped oscillations of the valve body arranged to cooperate with the valve seat arranged in the outflow of the valve.

This is obtained by the pressure relief valve as described in the appended claims.

SUMMARY OF THE INVENTION

It is a further object of the present invention to set forth a pressure relief valve configured for smooth and non fluctuating opening and closing under all operation scenarios.

According to the present invention, the above objects are met by the provision of a pressure relief valve as per the introductory part of this specification wherein the damper constitutes a bellows damper arranged to encircle the stem and wherein the bellows damper is arranged to dampen the movement of the valve, or of the valve body, by applying dampening force to the valve body via the stem when the pressure relief valve is open.

The pressure relief valve is open when the valve body in not resting in the valve seat.

The damper, or the bellows damper, may be configured such that that force curves of compression and expansion respectively diverge due to hysteresis loss. Alternatively, due to pronounced hysteresis loss.

The effect of the incorporation of a damper demonstrating hysteresis loss has been found to, in a safe and simple manner; prevent a pressure relief valve of type according to the above from oscillating.

Summarizing, the invention may be perceived as a pressure relief valve comprising a damper configured for dampening the oscillations of the moving body of the valve.

The damper may constitute an elastomeric bellows mounted in an enclosure between a fixed stop and a stop following with the moving body of the valve.

The damper may, as already revealed, be based on the principle of elastic hysteresis. Elastic hysteresis is the tendency for otherwise elastic materials to rebound with less force than were required to deform them.

Any kind of damper configured to rebound with less force than obtained during compression may be applied to the valve according to the present invention.

According to one embodiment, the bellows damper may be arranged in-between bellows contact faces, or stops, configured such that, when the pressure relief valve is closed, no force is applied to the valve body via the stem from the bellows damper. This is beneficial as, on one hand, the properties of the damper will remain constant, or essentially constant, for a prolonged period of time, and, on the other hand, as the force of the damper will not interfere with the delicate control of the opening pressure of the pressure relief valve.

According to some embodiments, the damper contact face, or stop, following the stem may constitute a magnet configured for controlling the opening pressure of the pressure relief valve.

According to one embodiment, the damper may be configured to rebound the stem and/or the valve body, during closing of the valve, with less force than absorbed during opening of the valve.

According to one embodiment, the damper may constitute a bellows. The bellow may be cylindrical and comprise closed or substantially closed walls.

According to one embodiment, the damper may be made from an elastic or elastomeric material.

According to one embodiment, damper may be made from a material demonstrating elastic hysteresis.

According to one embodiment, the damper may be provided in an enclosure arranged in the flow passage of the valve. The enclosure may constitute, define or accommodate, physical stops configured to limit the stroke of the valve body and stem thereby preventing the damper from receiving extreme compression and/or stretching.

According to one embodiment, the damper may be installed between a fixed stop connected to the valve housing and a stop following the stem, again in order to prevent the damper from receiving extreme compression and/or stretching.

According to one embodiment, the stops may be arranged such that, when the valve is closed, the damper exerts no force on the stem.

According to one embodiment, the stops may be arranged such that, during full opening of the valve, the damper is not compressed completely.

According to one embodiment, the pressure relief valve further may include a lifting element, or lifting disc, arranged in the flow passage, below to the valve seat. The lifting element may be connected to the valve body via the stem in order to allow the lifting element and the valve body to be moved axially, as one unit, between a closed state of the pressure relief valve and a state in which the pressure relief valve is open. The pressure relief valve may further be configured such that the essentially closed space is, at any time, in communication with the area above the lifting element.

According to one embodiment, the valve housing further may include a flow constriction defining an essentially truncated conically shaped interior and arranged to encircle the lifting element such that a radial passage, between the lifting element and the flow constriction, increase when the lifting element and the valve body is moved from a closed state of the pressure relief valve towards an open state of the pressure relief valve.

According to one embodiment, in a closed state of the pressure relief valve, the radial passage, or clearance, between the lifting element and the flow constriction may be minimum 12% of the internal radius of the flow constriction.

According to one embodiment, the valve body may have an outer surface embodied as to collect a gas flow that flows through the outflow passage and around the valve body to form an upwardly oriented jet. The valve body further may include a downwardly oriented valve face configured for abutting the valve seat in the outflow mouthing of the valve housing in order to define a closed state of the pressure relief valve.

According to one embodiment, the damper element may be configured for dampening oscillations of the valve body.

According to one embodiment, the wall is, opposite the outflow, connectable to a space to be ventilated.

According to one embodiment, the pressure relief valve further may include a magnet and a, opposed or not, magnet or a magnetisable body configured and arranged such that a force of attraction Fm between the magnet and the magnet or magnetisable body contribute in defining the abutment force Fc of the valve body against the valve seat in a closed state of the pressure relief valve.

According to one embodiment, the magnet may be fixedly mounted interiorly to the valve housing, optionally above any lifting element. The distance between the magnet and the, opposed or not, magnet or magnetisable body may be varied by way of suitable means.

According to one embodiment, the valve body may be essentially drop-shaped.

According to one embodiment, pressure relief valve for pressure equalization between an essentially closed space and the surrounding atmosphere is disclosed. The pressure relief valve includes a valve housing inter alia with:
- a wall defining a flow passage with an upwardly oriented outflow,
- a valve body arranged to cooperate with a valve seat arranged in the outflow,
- a stem configured for axial guidance of the valve body,
- a damper arranged to dampen axial movement of the stem.

wherein the damper is configured, or chosen, such that less than 98% of the dampers rebound force is returned to the stem.

DETAILED DESCRIPTION OF THE INVENTION

The invention will in the below be explained in further detail with reference to an arbitrary embodiment shown in the figures.

Figure 1:
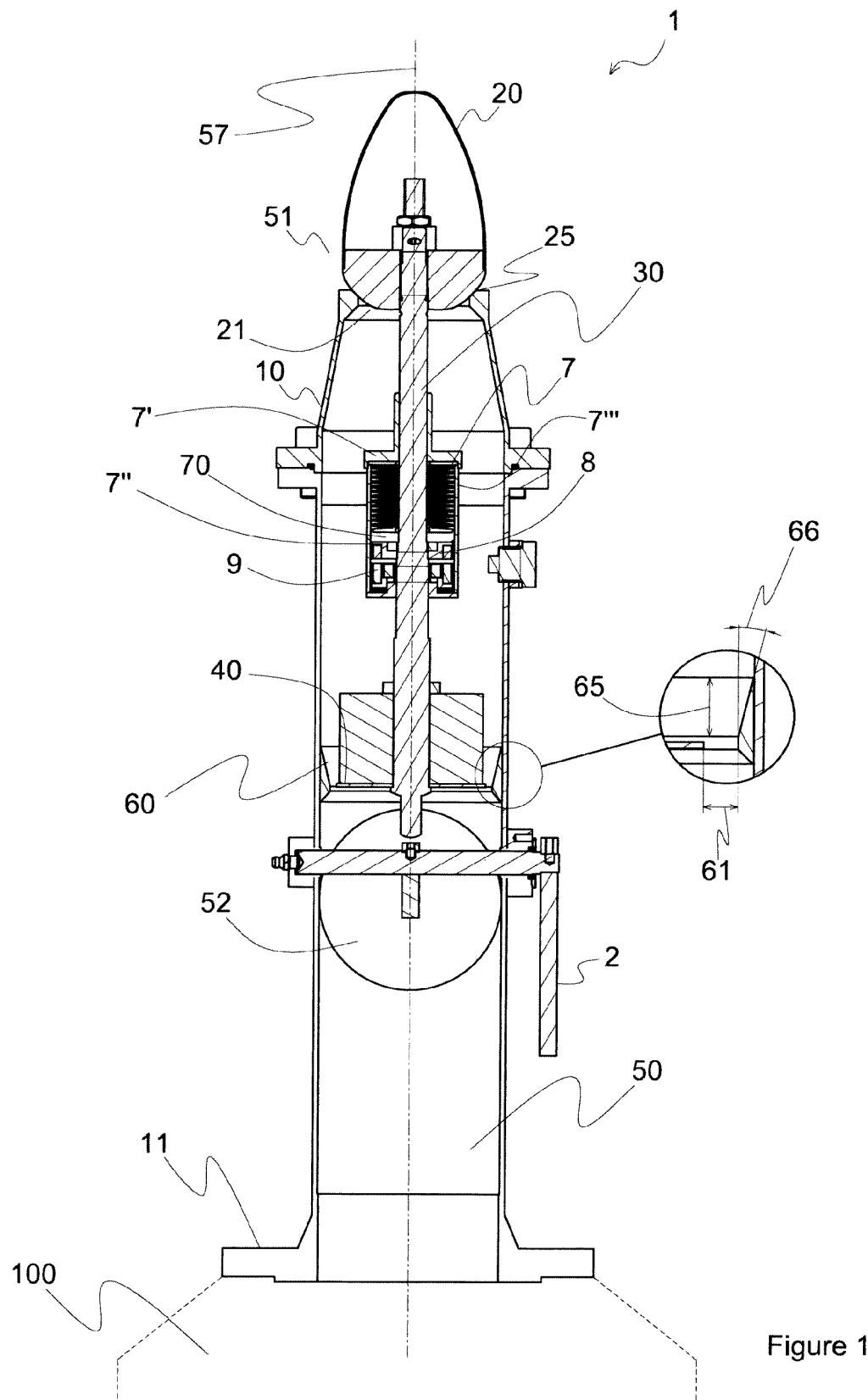
FIG. 1 illustrates a sectional view through a pressure relief valve in its closed state.

FIG. 1 illustrates a sectional view through a pressure relief valve according to an aspect of the present invention. The valve includes a vertically oriented valve housing 10 having, at its bottom, a flange 11 allowing for interconnection with a pressure release stub or equivalent allowing for communication in-between a space to be ventilated and the pressure release valve.

The flange 11 and the valve housing 10 may be bolted or otherwise fixed to the pressure release stub or equivalent on a gas-filled container.

The gas-filled container may constitute a tank or a cargo hold on a ship, and the top end of the pressure relief stub may be connected to a space to be ventilated.

The pressure relief valve 1 may have a tubular wall 10 defining a through-going flow passage 50 with an upwardly oriented outflow mouthing 51. Gas in a subjacent space 100, or tank, may escape to the free atmosphere under particular pressure conditions leading to venting through the valve and outflow mouthing 51.

The flow passage 51, at the top of the valve housing 10, preferably may have a circular cross section; however other cross-sectional configurations may be chosen, including e.g. a rectangular cross-section.

A vacuum relief opening 52, which may be oriented laterally or transverse to the longitudinal axis 57 of the valve, may be provided in the tubular wall 10. The opening 52 may be in communication with a not shown vacuum relief valve or equivalent which may or may not form part of the valve according to the present invention.

In the outflow mouthing 51, an annular valve seat 25 may be arranged, and the valve seat 25 may be configured to cooperate with a valve face on the lower face 21 of the valve body 20.

The valve body 20 is movably guided, by the stem 30 and along the axis 57, so as to be displaceable between an open state of the pressure relief valve and its closed state according to FIG. 1. Suitable stop elements may serve to limit or delimit the movement of the valve body 20.

The valve seat 25 and the valve face 21 may be embodied as conically corresponding faces, and the valve body 25 preferably may have a surface portion which is configured so as to allow a flow of gas flowing from the container upwards around the valve body 25 to be combined to an aggregate upwardly oriented jet of gas above the valve housing 10.

In addition to the closure provided by way of the valve body 20 abutting the valve seat 25, other and not shown means of sealing may be provided as an alternative or as a supplement. One example may be provision of an O-ring, arranged on the valve body 25 and/or on the valve housing 10 and/or the valve seat 25. Other means of sealing may be chosen such that closure may or may not be established in conjunction with the valve body 20 abutting the valve seat 25.

A stem 30, or rod-shaped connecting element 30, may, as shown in FIG. 1, be connected to the valve body 20 in order to provide axial guidance of the valve body 20 along the axis 57. The rod-shaped connecting element 30, or stem 30, extends down through the valve housing 1, and the stem 30 may be guided internally within the valve housing 10 by guides.

The connecting element or stem 30 may, during venting through the valve, be displaced along the flow passage 50, along the axis 57. On the connecting element 30, a lifting element, or disc, 40 may be mounted.

Damping means 7 may, in accordance with the present invention, be arranged to dampen the upwards and/or downward motions of the stem 30 incl. valve body 20 in order to dampen undesired oscillations or fluctuations of the valve body.

The damper 7 may be configured such that force curves of compression and expansion respectively diverge due to hysteresis loss or pronounced hysteresis loss.

Figure 2:
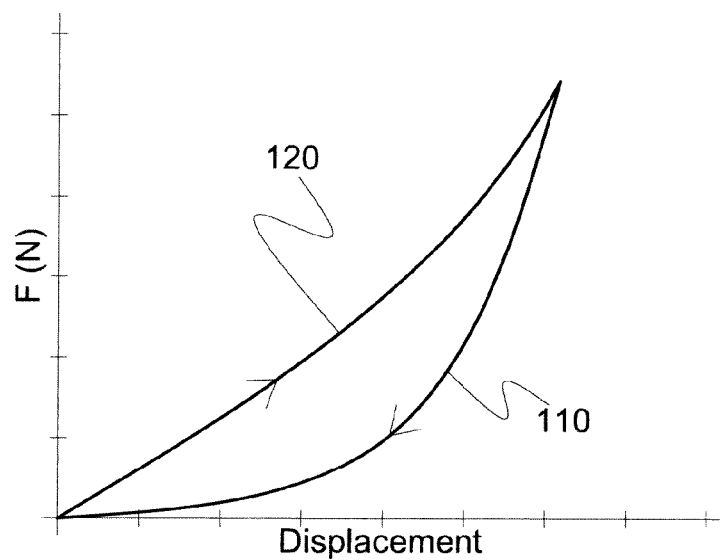
FIG. 2 is a curve illustrating schematically the behaviour of a damper demonstrating elastic hysteresis.

FIG. 2 schematically illustrates force versus displacement curves of a damper demonstrating elastic hysteresis. The curve 120 represent forces exercised on the stem 30 and the valve body 20 during damping of opening motion of the valve and the curve 110 represent the forces returned to the stem 30 and the valve body 20 during closing of the valve. From this, the skilled reader will realize that, in some embodiments, the damper 7 will oppose the forces of any lifting means configured for maintaining the stem 30 incl. valve body 20 in an open position.

Figure 3:
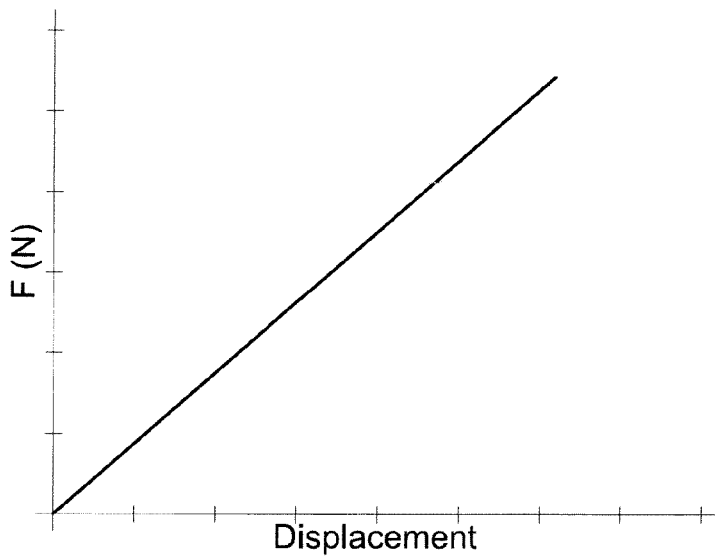
FIG. 3 is a curve illustrating the behaviour of a classic spring.

FIG. 3 schematically illustrates a force versus displacement curve of a linear damper demonstrating no elastic hysteresis.

The damper 7 may, as shown in FIG. 1, be configured to rebound the stem 30, during closing of the valve, with less force than absorbed during opening of the valve. The skilled reader will realize that the difference in energy received and absorbed by the damper inter alia will dissipate as heat.

The damper 7 may be made from an elastic or elastomeric material or equivalent.

As shown in FIG. 1, the damper 7, or the bellows damper 7, may be arranged in-between bellows contact faces 7', 7", or stops, configured and disposed such that, when the pressure relief valve is closed, no force is applied to the valve body 20 via the stem 30 from the damper 7. By this, as briefly mentioned earlier in this specification, the properties of the damper 7 will remain constant, or essentially constant, for a prolonged period of time as the damper 7 rests under its unloaded length. Further, by configuring the valve and the damper such that no force is applied to the valve body 20 via the stem 30 from the damper 7 when the valve is closed, the damper 7 will not interfere with the delicate control of the opening pressure of the pressure relief valve.

The lower damper contact face 7" following the stem 30 may constitute a sleeve connected to the stem 30. Alternatively, the lower damper contact face 7" may constitute a magnet 8 configured for controlling the opening pressure of the pressure relief valve.

The upper damper contact face 7' may form an integral part of the valve housing 10. Further, according to other embodiments, the upper damper contact face 7' may constitute a sleeve or similar maintained in a fixed position above the damper element by bracings etc.

It follows from the above, that the length of the interior gap defined by the upper and lower bellows contact faces 7', 7" may be larger than the length of the damper 7 it selves in its unloaded state.

The damper 7 may by suspended from the upper bellows contact face 7' whereby a gap 70 may be defined between the lower face of the bellows 7 and the lower bellows contact face 7".

A flow constrictor 60, or venturi, may be arranged on the interior face of the valve housing 10. The flow constrictor 60 may be arranged essentially in level with the lifting element 40 and also around the lifting element 40.

The lifting element may be embodied as a thin plate or, as shown in FIG. 1, as a cylindrical lifting element having a certain height, e.g., as shown, a height essentially corresponding the diameter of the lifting element.

The flow constrictor 60, together with the lifting element 40, define an annular gap 61 varies in width as a function of the height assumed be the lifting element 40.

The flow constrictor 60, or venturi, may form an integrated part of the valve housing 10. As an equal alternative, the flow constrictor 60, or venturi, may be provided as a component to be fixed inside the flow passage, e.g. by bolts, welding or press fitting etc. during assembly the pressure relief valve. Further, the flow constrictor 60, or venturi, may be retrofitted into present pressure relief valves.

According to desired characteristics of the pressure relief valve, the lifting element 40 may be configured with an uninterrupted or closed surface whereby gas in the flow passage 50 may flow around the lifting element 40 to the area above the lifting element 40 through the gap 61.

In a favourable valve according to the present invention, the configuration of the lifting element 40 and the flow constrictor 60 is adapted to the characteristics of the damper element 7 to provide a valve configured for mitigating, or avoiding, oscillations of the valve body 20.

As shown in FIG. 1, the pressure relief valve also may include an actuator unit 2 for producing a control movement of the connecting element 30 and thus of the valve body 20. The actuator unit 2 can be operated from the exterior of the valve housing 10 by means of a handle.

In association with the connecting element 30, the pressure relief valve also may comprise a magnet 8 that may, as shown in FIG. 1, be mounted in the flow passage 50 above the lifting element 40, and an opposed magnet or magnetisable body 9 configured for to cooperate with the magnet 8 in the closed, or essentially closed, state of the pressure relief valve. The magnet 8 and the opposed magnet or magnetisable body 9 may optionally be located in the area below the lifting element 40 which may be preferred when there is a need for achieving regular access to the magnet 8. The magnet 8 may be a permanent magnet or e.g. an electromagnet, the magnetisable body 9 and the magnet 8 may replace one another.

In the closed position of the pressure relief valve, as shown in FIG. 1, the valve body 20 contacts the valve seat 25 by a downwardly oriented abutment force Fc that contains contributions from:

the mass of the valve body 20,
    the mass of the connecting element 30,
    the mass of any weight load,
    the mass of either the magnet 8 or the magnetisable body 9, depending on which of these parts is mounted on the connecting element 30, and
    the force of attraction Fm between the magnet 8 and the magnetisable body 9.

The damping means 7, or the bellows damper 7, as explained earlier in this specification, do not contribute to the abutment force Fc.

The abutment force Fc is, as per the above, to be understood as the force that keeps the pressure relief valve closed, i.e. the closing force of the pressure valve. The abutment force Fc may be changed e.g. by varying the position relative to each other of the magnet 8 and the opposed magnet or magnetisable body 9, a gap of a given size optionally being present in-between the elements in the closed position of the pressure valve.

When, in the space to be ventilated, the pressure rises above atmospheric pressure such pressure will, due to the gap 61, also reign in the space between the lifting element 40 and the valve body 20. The pressure in this space is thereby equal to the pressure within the space to be ventilated, and the pressure influences the top face and lower face of the lifting element 40 by the same force.

As long as the superatmospheric pressure does not give rise to an upwardly oriented force on the valve body 20 that exceeds the closing force Fc of the pressure relief valve, the pressure relief valve will remain in the closed state. The upwardly oriented force on the valve body 20 can be determined as the superatmospheric pressure in the container multiplied by the area Ai of the mouthing 51 of the flow passage 50.

When the superatmospheric pressure exceeds the closing force Fc of the pressure relief valve, the pressure relief valve opens. The outflow of gas causes the pressure on the face of the lifting element 40 that faces towards the mouthing to drop. The upwardly oriented movement of the valve body 20 towards the entirely open position of the pressure relief valve is then controlled to a certain extent by the force exerted by the flowing gas on the lower face of the lifting element 40. This influence can be determined as the superatmospheric pressure of the space to be ventilated multiplied by the area A2 of the lifting element 40. Since this area exceeds the area Ai of the outflow mouthing 51, the lifting force of the gas on the lifting element 40 increases, and the rate of movement of the lifting element 40 and hence of the valve body 20 in a direction towards the entirely open state of the pressure relief valve increases.

Summarizing, by the invention it is ensured that the pressure relief valve according to the present invention will open and close controllably, without oscillations, when the pressure within the space to be ventilated 100 require regulation by way of opening the pressure relief valve.

The application and combination of features and solutions presented by the present invention is not limited to the presented embodiments. One or more features of one embodiment can and may be combined with one or more features of other embodiments, whereby not described but valid, embodiments of the present invention may be obtained.

The term "comprises/comprising/comprised of" when used in this specification incl. claims is taken to specify the presence of stated features, integers, steps or components but does not preclude the presence or addition of one or more other features, integers, steps, components or groups thereof.

The invention claimed is:

1. A pressure relief valve for pressure equalization between an essentially closed space and a surrounding atmosphere, said pressure relief valve includes a valve housing comprising:
    a wall defining a flow passage with an upwardly oriented outflow passage,
    a valve body arranged to cooperate with a valve seat arranged in said outflow passage, said valve body having an outer surface geometry configured for collecting a flow of gas that flows through said outflow passage and around said valve body to form an upwardly oriented jet,
    a stem configured for axial guidance of said valve body in and out of said valve seat,
    a damper arranged to dampen axial movement of said valve body
    wherein said damper constitutes a bellows damper arranged to encircle said stem and said bellows damper is arranged to dampen the movement of said valve body by applying a dampening force to said valve body via said stem when said pressure relief valve is open,
    wherein said bellows damper is arranged between bellows contact faces, configured such that, when said pressure relief valve is closed, no force is applied to said valve body via said stem from said bellows damper.

2. The pressure relief valve according to claim 1, wherein said bellows damper has force curves of compression and expansion that are respectively diverge due to hysteresis loss.

3. The pressure relief valve according to claim 1, wherein said bellows damper is arranged to dampen the opening movement of said valve body when said stem moves upwards a distance equivalent to a length of a gap defined by a lower bellows contact face and a lower face of said bellows damper when said pressure relief valve is closed.

4. The pressure relief valve according to claim 1, wherein said bellows damper is configured to rebound said valve body, during closing of said pressure relief valve, with less force than absorbed during opening of said pressure relief valve.

5. The pressure relief valve according to claim 1, wherein said bellows damper constitutes a cylindrical bellows damper.

6. The pressure relief valve according to claim 1, wherein said bellows damper defines an interior which is in unregulated communication with said flow passage.

7. The pressure relief valve according to claim 1, wherein said damper is made from an elastomeric material.

8. The pressure relief valve according to claim 1, wherein said damper is made from a material demonstrating elastic hysteresis.

9. The pressure relief valve according to claim 1, wherein said damper is installed in a supporting enclosure in said flow passage.

10. The pressure relief valve according to claim 1, wherein said damper is installed between a fixed stop, or a first bellows contact face, connected to said valve housing and a second bellows contact face following said stem.

11. The pressure relief valve according to claim 9, wherein said first and second bellows contact faces, are arranged such that, during full opening of said valve, said bellows damper is not compressed completely.

12. The pressure relief valve according to claim 1, wherein said pressure relief valve further includes a lifting element arranged further down in said flow passage, relative to said valve seat, and wherein said lifting element is connected to said valve body via said stem in order to allow said lifting element and said valve body to be moved axially, as one unit, between a closed state of said pressure relief valve and a state in which said pressure relief valve is open, and wherein said pressure relief valve is configured such that the essentially closed space is, at any time, in communication with an area or space above said lifting element.

13. The pressure relief valve according to claim 12, wherein said valve housing further includes a flow constriction defining an essentially truncated conically shaped interior and arranged to encircle said lifting element such that a radial passage between said lifting element and said flow constriction increases when said lifting element and said valve body are moved from a closed state of said pressure relief valve towards an open state of said pressure relief valve.

14. The pressure relief valve according to claim 13, wherein, in the closed state of said pressure relief valve, said radial passage between said lifting element and said flow constriction is a minimum 12% of an internal radius of said flow constriction.

15. The pressure relief valve according to claim 1, wherein said valve body further includes a downwardly oriented valve face configured for abutting said valve seat in an outflow mouthing of said valve housing in order to define a closed state of said pressure relief valve.

16. The pressure relief valve according to claim 1, wherein said damper element is configured for dampening oscillations of said valve body.

17. The pressure relief valve according to claim 1, wherein said wall is, opposite said outflow passage, connectable to a space to be ventilated.

18. The pressure relief valve according to claim 1, wherein said pressure relief valve further includes a first magnet and a second magnet or a magnetisable body configured and arranged such that a force of attraction between said first magnet and said second magnet or magnetisable body contributes in defining an abutment force of said valve body against said valve seat in a closed state of said pressure relief valve.

19. The pressure relief valve according to claim 18, wherein said first magnet is fixedly mounted interiorly of the valve housing above said lifting element and wherein a distance between said first magnet and said second magnet or magnetisable body can be varied.

20. The pressure relief valve according to claim 1, wherein said valve body is essentially drop-shaped.

21. The pressure relief valve according to claim 1, wherein said valve constitutes a high velocity pressure relief valve configured to prevent passage of flames by way of configuring said outflow passage such that a velocity of a gas released from said outflow passage is at least 30 m/s.

* * * * *